United States Patent
Oestreich et al.

(10) Patent No.: US 6,405,020 B1
(45) Date of Patent: Jun. 11, 2002

(54) METHOD AND BASE STATION SYSTEM FOR VOICE TRANSMISSION VIA A RADIO INTERFACE IN A DIGITAL RADIO COMMUNICATION SYSTEM

(75) Inventors: Stefan Oestreich, Holzkirchen; Michael Farber, Wolfratshausen; Meik Kottkamp, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/535,650

(22) Filed: Mar. 24, 2000

Related U.S. Application Data

(63) Continuation of application No. PCT/DE98/02744, filed on Sep. 16, 1998.

(30) Foreign Application Priority Data

Sep. 24, 1997 (DE) .......................... 197 42 124

(51) Int. Cl.$^7$ .......................... H04B 17/00; H04Q 7/20
(52) U.S. Cl. .......................... 455/67.3; 455/561; 455/63; 455/67.5; 455/424
(58) Field of Search .......................... 455/424, 423, 455/67.3, 67.5, 561, 63, 69; 370/252, 465, 468

(56) References Cited

U.S. PATENT DOCUMENTS

| | | | | |
|---|---|---|---|---|
| 5,023,900 A | * | 6/1991 | Tayloe et al. | 455/424 |
| 5,095,500 A | | 3/1992 | Tayloe et al. | 455/424 |
| 5,278,866 A | * | 1/1994 | Nonami | 375/227 |
| 5,327,576 A | * | 7/1994 | Uddenfeldt et al. | 455/436 |
| 5,623,484 A | * | 4/1997 | Muszynski | 455/423 |
| 5,701,294 A | * | 12/1997 | Ward et al. | 370/252 |
| 5,839,077 A | * | 11/1998 | Kowaguchi | 455/67.3 |
| 5,878,328 A | * | 3/1999 | Chawla et al. | 455/67.1 |
| 5,940,439 A | * | 8/1999 | Kleider et al. | 455/69 |
| 5,987,319 A | * | 11/1999 | Hermansson et al. | 455/422 |
| 6,088,588 A | * | 7/2000 | Osborne | 455/423 |

FOREIGN PATENT DOCUMENTS

| | | | | |
|---|---|---|---|---|
| DE | 195 49 148 | | 7/1997 | H04Q/7/20 |
| WO | 97/03403 | * | 1/1997 | H04B/7/26 |
| WO | 97/13388 | | 4/1997 | H04Q/7/38 |
| WO | 97/33402 | | 9/1997 | H04B/7/26 |
| WO | 97/41641 | | 11/1997 | H04B/1/00 |

OTHER PUBLICATIONS

Yuen et al., "Variable Rate Speech and Channel Coding for Mobile Communication", IEEE 44th Vehicular Technology Conference, pp. 1709–1713, Jun. 1994.*

"Effizienter Teilnehmerzugriff für 3. Generation der Mobilkommunikation" (Ketseoglou et al., Siemens AG), dated 1993, Telcom Report 16, Heft 1, pp. 38–41, pertains to a n efficient subscriber access for $3^{rd}$ generation mobile communication, as mentioned on p. 3 of the specification.

(List continued on next page.)

Primary Examiner—William Trost
Assistant Examiner—Rafael Perez-Gutierrez
(74) Attorney, Agent, or Firm—Laurence A. Greenberg; Werner H. Stemer; Gregory L. Mayback

(57) ABSTRACT

A method for voice transmission via a radio interface in a digital radio communication system includes the step of transmitting at least one signal between a base station of a base station system and a radio station. At least one characteristic value relating to the transmission conditions of the radio interface is determined from this signal. The characteristic value is stored in at least one storage device and is taken into account at a later point in time in addition to currently determined characteristic values for a voice and channel coding on the transmitter side. A base station system for voice transmission via a radio interface in a digital radio communication system is also provided.

26 Claims, 5 Drawing Sheets

OTHER PUBLICATIONS

"3 Aufbau und Organisation des GSM–Systems" pp. 57–92, pertains to the setup and organization of the GSM–system, as mentioned on p. 1 of the specification.

"Drahtlos zum Freizeichen" (Reiss, Siemens AG), dated 1995, Telcom Report 18, Heft 1, 4 pages, pertains to a flexible RLL–system, as mentioned on p. 2 of the specification.

* cited by examiner

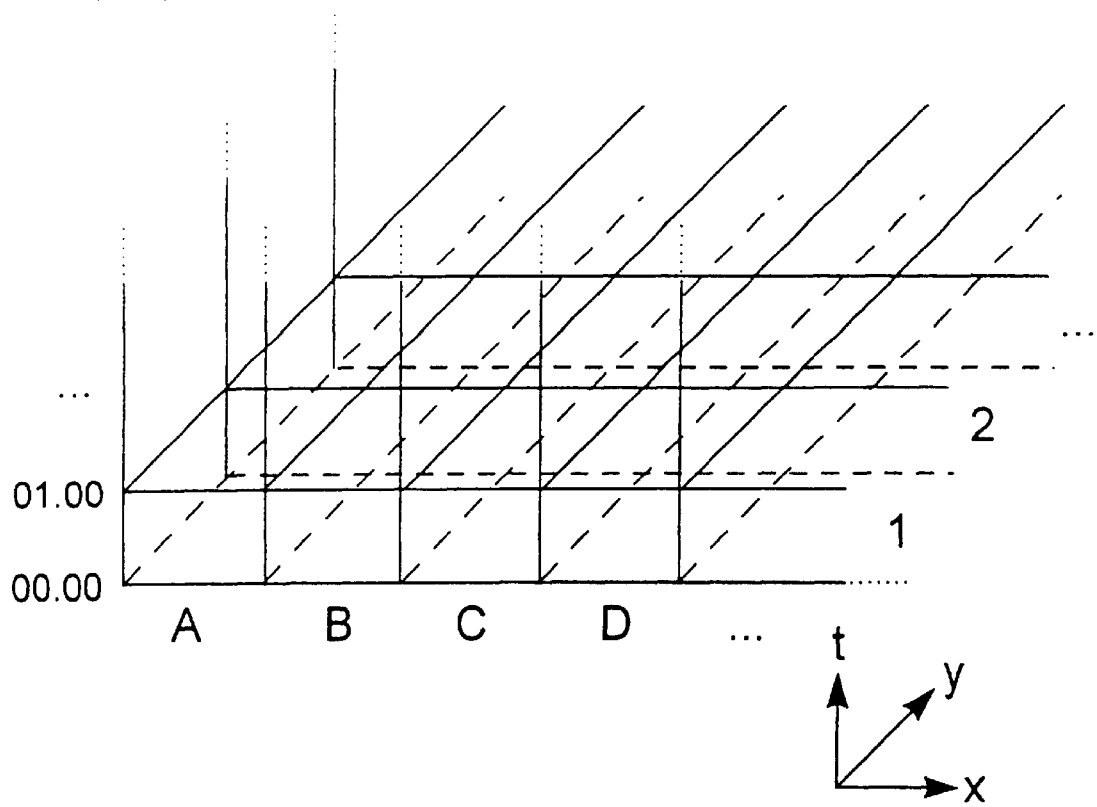

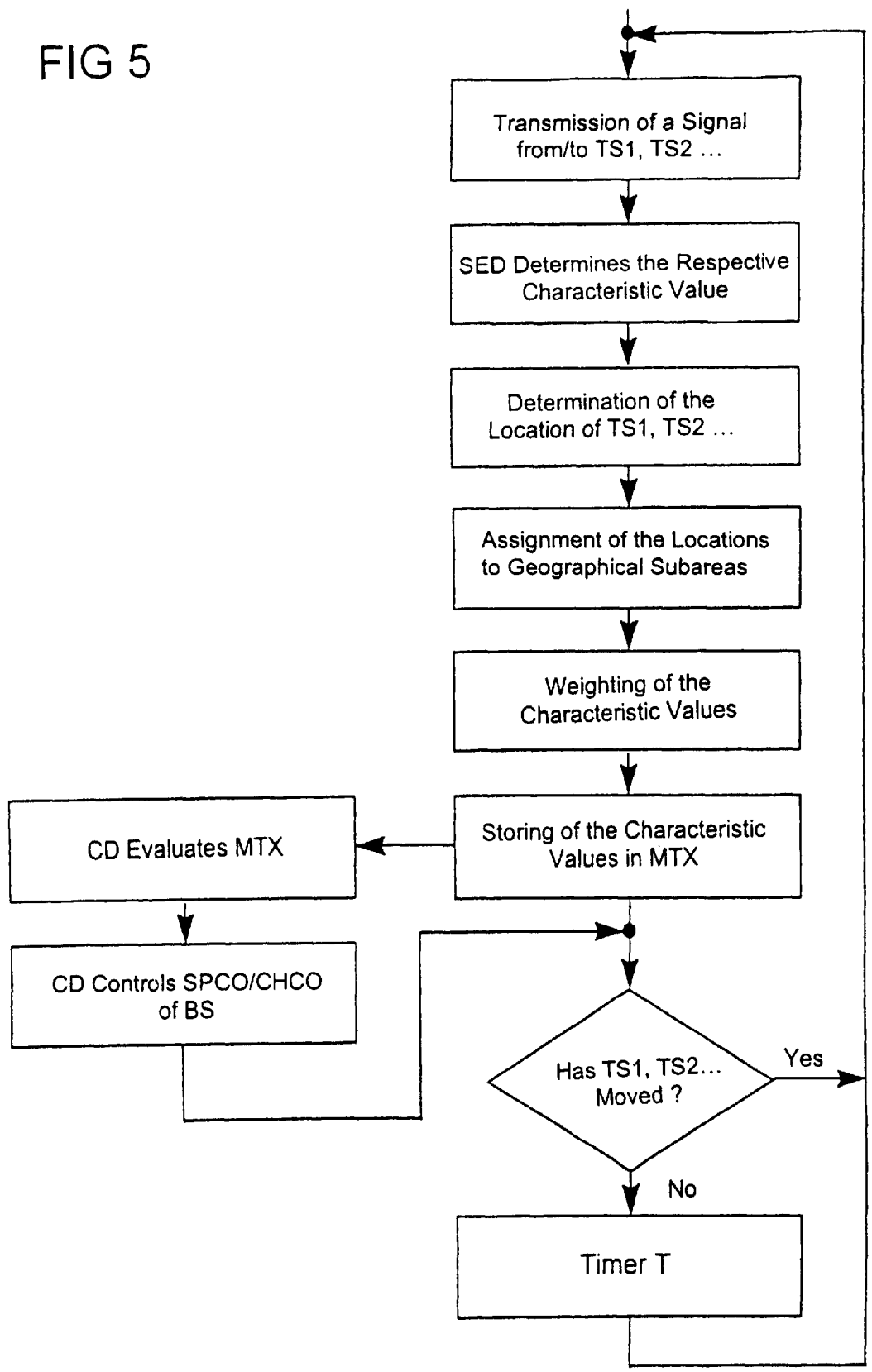

METHOD AND BASE STATION SYSTEM FOR VOICE TRANSMISSION VIA A RADIO INTERFACE IN A DIGITAL RADIO COMMUNICATION SYSTEM

CROSS REFERENCE TO RELATED APPLICATION

This application is a continuation of International Application No. PCT/DE98/02744, filed Sep. 16, 1998, which designated the United States.

BACKGROUND OF THE INVENTION

Field of the Invention

The invention relates to a method and a base station system for voice transmission via a radio interface in a digital radio communication system, in particular in a digital mobile radio system or in a wireless subscriber access system or access network system.

A base station system is a part of a digital radio communication system which may correspond, for example, to the GSM mobile radio network (Global System for Mobile Communications), as is known, inter alia, from the publication "Mobilfunk und intelligente Netze" [Mobile radio and intelligent networks], by J. Biala, Vieweg Publishers, 1995, in particular pages 57 to 92. In particular, the radio communication system may alternatively correspond to a third generation mobile radio system (UMTS—Universal Mobile Telecommunications System) which in general will have the same system configuration as the GSM mobile radio network, or an access network system as is known from the article "Drahtlos zum Freizeichen" [Wireless to the call connected signal], by M. Reiβ, telcom report 18, 1995, pages 34 to 37.

Such radio communication systems allow communication links to be set up to transmit information, in particular voice information, via a radio interface between base stations and subscriber radio stations. The radio stations may in this case be configured, for example, as mobile stations in a mobile radio system, or as wireless network access units in an access network system.

Various methods are used for subscriber separation. These methods are generally based on a frequency-division multiplexing method FDMA (Frequency Division Multiple Access) with a given frequency bandwidth being split up into a plurality of frequency channels for use. If a plurality of subscribers on a common carrier frequency in the radio interface are separated by different timeslots, then a time-division multiplexing method TDMA (Time Division Multiple Access) is also involved, as is also used, for example, in the GSM mobile radio system. If the subscribers on the same carrier frequency are separated by different codes, then a code-division multiplex method (CDMA—Code Division Multiple Access) is involved, as is known, inter alia, from the article "Effizienter Teilnehmerzugriff für 3. Generation der Mobilkommunikation" [Efficient subscriber access for $3^{rd}$ generation mobile communication], by T. Ketseglou, T. Zimmermann, telcom report 16, 1993, pages 38 to 41. Such a CDMA method is intended for both, second and third generation mobile radio systems and for access network systems. Furthermore, Published Non-Prosecuted German Patent Application DE 195 49 148 discloses a hybrid of these two methods for subscriber separation, which has time-division multiplex subscriber separation in addition to CDMA subscriber separation.

A radio communication system includes at least one base station system which contains, for example, a base station controller which is connected to a plurality of base stations. The base stations each supply a radio area, also called a radio cell, with radio resources. In this case, each base station may have only a limited supply of radio resources, in order to avoid interference. The radio areas of adjacent base stations overlap at the boundary regions of the radio cells or as a result of the radio cells being formed hierarchically, as is planned for second and third generation mobile radio systems. In mobile radio systems, the connection of a plurality of base stations to one base station controller allows a handover procedure between two base stations in order to make it possible for a mobile subscriber to have unrestricted freedom of movement with his mobile station.

The base station controller in this case carries out the function of switching and management of the radio channels in the base station, and administration and implementation of handover procedures.

In digital radio communication systems, digital voice codecs are used for coding voice information. In a GSM mobile radio system, these voice codecs include, for example, a voice coder and a downstream channel coder. In the voice coder, the 64 kbit/s data rate of PCM30 channels is reduced, for example, to a data rate of 13 kbit/s, which is called the net bit rate since it contains only the pure coded voice information. Additional redundancy is then added to the voice signal in the channel coder through the use of an error correction method, so that the bit rate is increased, for example, to 22.8 kbit/s, the gross bit rate. This example relates to a full-rate codec. As a further development, half-rate codecs have also been introduced in the GSM mobile radio system, which use only half the data rate for voice transmission. Such a compression of the voice signals is necessary since the available radio resources are limited and the aim is to supply as many subscribers as possible using the mobile radio system.

The proportion of error protection in the gross data rate (=net data rate of the wanted data+error protection) with the voice codecs in use is in general high, and is excessive if the transmission channel conditions are good. For this reason, the use of adaptive multirate voice codecs (AMR—Adaptive Multi Rate) is proposed, where the proportion of error protection is varied as a function of the transmission conditions on the radio interface. By reducing the error protection, it is possible to increase the bit rate after voice coding, and thus to improve the voice quality, or to reduce the gross data rate and thus create capacities for further subscribers.

The bit error rate determined by the receiving radio station may be used, for example, as a parameter for determining the error protection. However, this parameter has the disadvantage that the bit error rate can change very quickly as a result of short-term disturbances, such as shadowing by obstructions and, in particular, resulting from the movement of subscribers of mobile radio systems, so that the voice codec is unable to follow such a fast change. Furthermore, it is hardly possible to estimate the future transmission conditions from values measured in the past.

SUMMARY OF THE INVENTION

It is accordingly an object of the invention to provide a method and a base station system which overcome the above-mentioned disadvantages of the heretofore-known methods and systems of this general type and which allow improved voice and channel coding, irrespective of fluctuations, in particular short term variations, in the transmission channel characteristics.

With the foregoing and other objects in view there is provided, in accordance with the invention, a method for voice transmission via a radio interface in a digital radio communication system including a base station connected to a base station controller, and a radio station located in a radio coverage area of the base station. The method includes the steps of:

transmitting a signal via a radio interface between a radio station and a base station;

determining, from the signal, a characteristic value relating to transmission conditions of the radio interface;

storing the characteristic value in a storage device for providing a stored characteristic value;

performing, with a voice and channel codec, a voice and channel coding at a transmitter side for a voice transmission; and controlling the voice and channel coding at the transmitter side by taking into account a currently determined characteristic value and the previously determined stored characteristic value.

In other words, in the method according to the invention for voice transmission via a radio interface in a digital radio communication system which has at least one base station which is connected to a base station controller, as well as at least one first radio station which is located in the radio coverage area or radio supply area of the base station, at least one signal is transmitted via the radio interface between the first radio station and the base station. At least one characteristic value relating to the transmission response of the radio interface is determined from this signal. The characteristic value is stored in at least one storage device and is taken into account at a later point in time in addition to a currently determined characteristic value for controlling transmitter-side voice and channel coding through the use of at least one voice and channel codec.

This characteristic value may be related, in a first embodiment of the invention, to a reception level, a bit error rate and/or a value which is proportional to the signal propagation time between the first radio station and the base station, and/or a signal-to-noise ratio. Characteristic values, which can be obtained particularly easily from radio communication systems, are the reception level and the bit error rate (which are indicated as scaled values RXLEV, RXQUAL) since, as a rule, these are already available in current implementations.

In two alternative embodiments of the invention, the voice and channel codec is driven in such a way that, in the first embodiment, the bit rate of the error protection is varied in the channel codec, and the thus the gross bit rate at the output of the channel codec as well, with the net bit rate at the output of the voice codec being kept constant, and in such a manner that, in the second embodiment, the net bit rate at the output of the voice codec and the bit rate of the error protection in the channel codec are varied, with the gross bit rate at the output of the channel codec being kept constant.

The first of these two embodiments has the advantage that by reducing the error protection, the gross bit rate is reduced, and additional capacity is thus created for further voice transmissions on the radio interface. On the other hand, the second embodiment has the advantage that the voice coding can be configured to be more generous when there is less error protection, thus improving the voice quality.

According to a further embodiment, a statistical mean value or a difference is determined from the stored and the currently determined characteristic value, and this is taken into account in each case for controlling the voice and channel codec.

The radio coverage area or radio supply area of the base station is also advantageously split into geographical subareas, and the location or position of the radio station is determined and assigned to a geographical subarea. The location or position may in this case be determined through the use of a global localization system, such as the GPS (Global Positioning System) by directional antennas, range measurements and/or during the network planning of the radio communication system.

In a further embodiment of the invention, this assignment of radio stations to geographical subareas allows the determined characteristic value to be weighted by a weighting coefficient. This weighting coefficient is defined for the individual geographical subareas during network planning, and may vary as a function of geographical characteristics and/or time. Time variation may be worthwhile and advantageous, for example, due to the traffic level being increased as a function of the time of day, that is to say increased transmission disturbances, or as a result of a higher subscriber density. The weighting coefficient thus has the advantageous effect that, for example, more error protection is used in certain subareas and/or at certain times, in order to ensure a uniformly high transmission quality.

A combination of a plurality of geographical subareas which have the same or similar geographical characteristics to form a subarea and the definition of a common weighting coefficient is advantageous, for example, in rural regions, thus allowing the determination and storage of the characteristic values, and the control process, to be simplified.

In accordance with another mode of the invention, the characteristic value is determined periodically at given time intervals or when the radio station moves from one of the geographical subareas to another one of the geographical subareas.

In accordance with yet another mode of the invention, further characteristic values relating to the transmission conditions between the base station and further radio stations, which are located in the radio coverage area of the base station or the same geographical subarea as the radio station, are determined and stored in the storage device. The previously determined stored further characteristic values and currently determined characteristic values are used for controlling the voice and channel coding at the transmitter side for the voice transmission between the base station and the radio station.

With the objects of the invention in view there is also provided, a base station system in a digital radio communication system having a radio station. The base station system includes:

a base station covering a radio coverage area and having a transmitting/receiving device for transmitting and receiving voice information via a radio interface between the base station and the radio station located in the radio coverage area of the base station;

a base station controller connected to the base station;

a signal evaluation device for determining a characteristic value from a signal transmitted via the radio interface, the characteristic value relating to transmission conditions of the radio interface;

a storage device storing the characteristic value for providing a stored characteristic value;

a voice and channel codec associated with the base station controller, the voice and channel codec performing a transmitter-side voice and channel decoding for a voice transmission via the radio interface; and a control device operatively connected to the voice and channel codec for controlling the transmitter-side voice and channel decoding as a function of the stored characteristic value having been determined previously and the characteristic value having been determined currently.

In a further advantageous embodiment, a three-dimensional memory matrix is provided in the storage device, in which the characteristic value is entered on the basis of the geographical subarea in which the first radio station is located, and on the basis of time. Together with the weighting coefficients which are in each case stored for the geographical subarea, thus all the data required for an optimum control of the voice and channel codec is available.

The characteristic value can be determined and stored at predetermined time intervals, periodically, controlled by a timer. In a situation where the first radio station is in the form of a mobile radio station, the characteristic value may also be stored on changing to a different geographical subarea of the radio coverage area of the base station. The control of the voice and channel coding may likewise be initiated on the basis of the same criteria.

These embodiments advantageously make it possible to take account of empirical values, that is to say periodically stored characteristic values, which for instance depend on a position and a time and which are, if expedient, in each case weighted by weighting coefficients, for controlling the voice and channel codec. This advantageously smoothes out short-term disturbances in the transmission quality, and the voice coding can be carried out, for example, with an optimally matched error protection.

In accordance with another feature of the invention, the control device weights the characteristic value by a weighting coefficient, which is defined for each of the geographical subareas and varies as a function of at least one of geographical characteristics and time.

In two further embodiments of the invention, the control of the transmitter-side voice and channel coding takes account not only the stored and currently determined characteristic values for the voice transmission between the base station and the first radio station, but also stored and currently determined characteristic values relating to the transmission response between the base station and further radio stations. These further radio stations are in this case likewise located in the radio coverage area of the base station, or in the same geographical subarea as the first radio station.

This advantageously provides a database in which characteristic values are stored of all the radio stations located in the radio coverage area of the base station, on the basis of position and time. In this case, for a mobile radio station which, for example, is entering a new geographical subregion, it is possible to access the characteristic values of other radio stations which are located or have been located in that subregion, for controlling the voice and channel codec, in order in this way to provide voice and channel coding that is as optimal as possible. As a result of these measures, the control of the voice and channel coding becomes highly insensitive to short-term disturbances in the transmission quality. Disturbances of longer duration, on the other hand, are taken into account by regularly determining the characteristic values and, for example, their statistical mean value.

The following description of a plurality of exemplary embodiments of the method according to the invention and of the base station system according to the invention is only of an exemplary nature. The described features are not necessarily required in the described form in order to achieve the desired success.

Other features which are considered as characteristic for the invention are set forth in the appended claims.

Although the invention is illustrated and described herein as embodied in a method and base station system for voice transmission via a radio interface in a digital radio communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is an exemplary schematic illustration of a three-dimensional memory matrix; and FIG. 5 is a flowchart of the method according to the invention.

DESCRIPTION OF THE PREFERRED EMBODIMENTS

Figure 1:
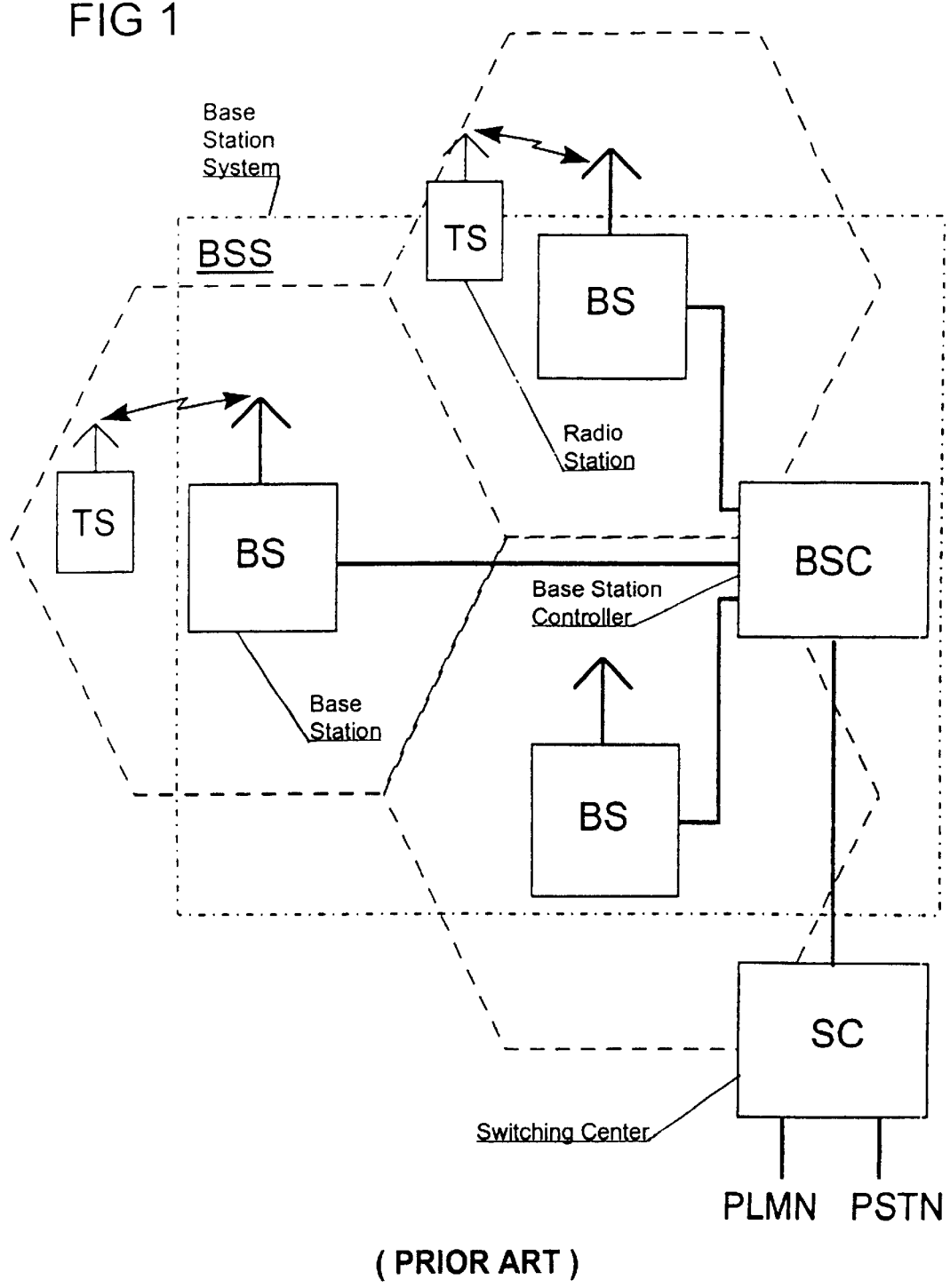
FIG. 1 is a block diagram illustrating a general conventional radio communication system.

Referring now to the figures of the drawings in detail and first, particularly, to FIG. 1 thereof, there is shown a radio communication system, which corresponds to a part of a GSM mobile radio system but which can also be transferred to a third generation mobile radio system or a wireless subscriber access system or access network system. Such a radio communication system includes one or a plurality of switching centers SC, which are networked to one another or provide the access to a fixed network PSTN or to a mobile radio network PLMN. Furthermore, these switching centers SC are each connected to at least one base station controller BSC. Each base station controller BSC in turn allows a connection to at least one base station BS, which can set up and clear communication links from subscribers, via a radio interface, to one or more radio stations TS.

Each base station BS supplies or covers in each case one geographical area with radio resources. According to FIG. 1, the base stations BS each, for example, supply an area which is illustrated in simplified form as a hexagon and is generally called a radio cell. Overlaps are provided at the boundaries of the respective cells so that, for example, a radio station TS located in the overlap area can set up a link to at least two base stations BS. Together with the base station controller BSC, the base stations BS form a base station system BSS.

Figure 2:
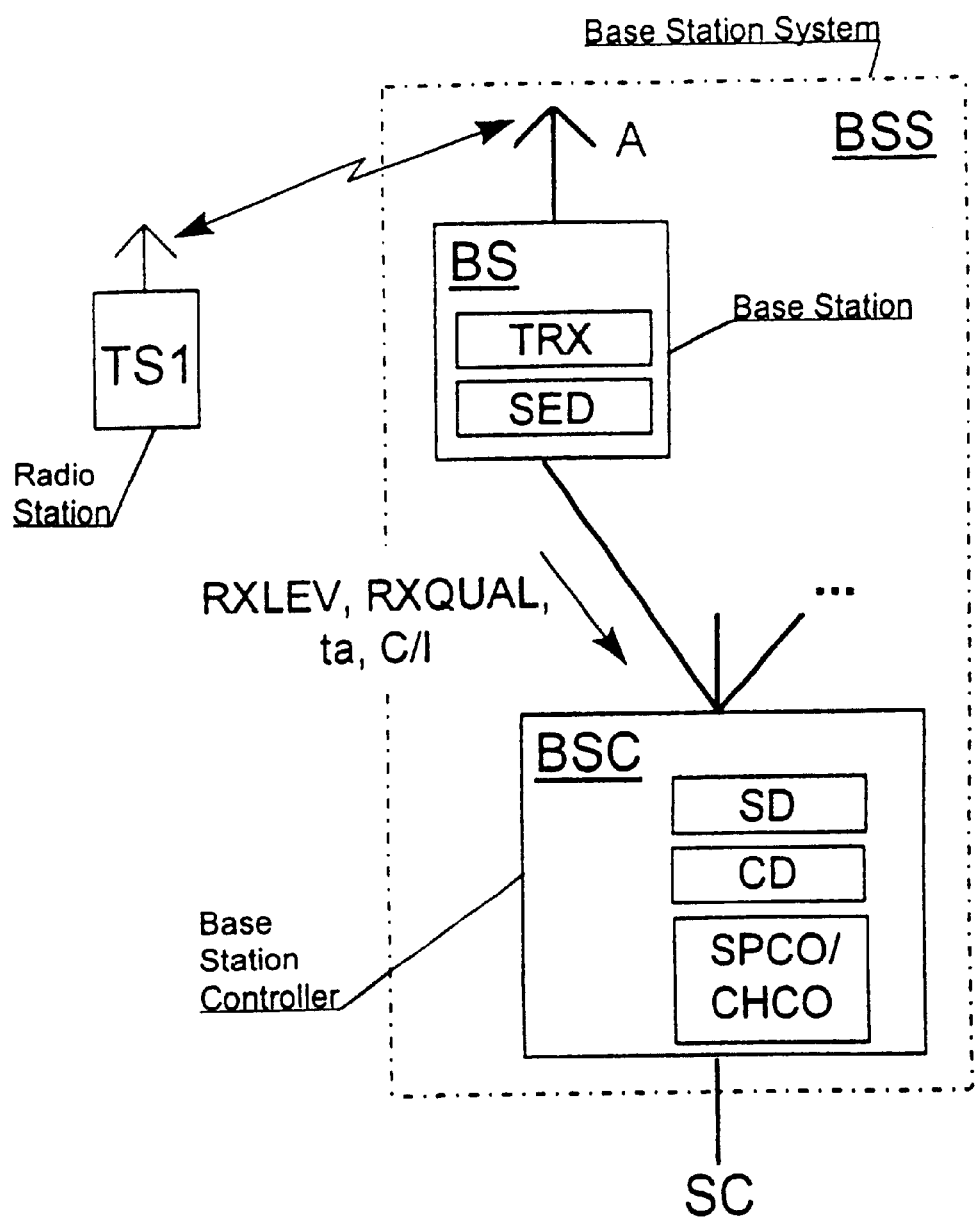
FIG. 2 is a block diagram of components of the base station system according to the invention.

Components of this base station system BSS are illustrated by way of example in FIG. 2. The base station controller BSC may be provided as a separate unit or together with a base station BS or other components of the radio communication system.

The base station BS uses an antenna A and a transmitting/receiving device TRX to receive wanted or useful information and signaling information as well as measurement values relating to the transmission conditions of the radio interface to the first radio station TS1, and signals this information to the base station controller BSC. Such measurement parameters, which may in some cases only be obtained after internal conversion calculations have been carried out in a signal evaluation device SED in the base station BS, are, for example, the reception level RXLEV, a scaled variable relating to the bit error rate RXQUAL, a lead time or rate time ta or a signal-to-noise ratio C/I. These values may also be determined by the first radio station TS1, and transmitted via the radio interface to the base station BS.

The determined characteristic values are stored in a storage device SD in the base station controller BSC, although it is equally possible for this storage device SD to be in the base station BS. The characteristic values RXLEV, RXQUAL are, for example, signaled by the radio station TS1 in a GSM mobile radio system, while the details relating to the signal propagation time in the form of the lead time ta, and the details relating to the signal-to-noise ratio C/I are obtained from the received signals in the base station BS itself. However, it is likewise possible to store only values determined in the first radio station TS1 or in the base station BS, or alternative combinations, in the storage device SD.

In addition to other components, the base station controller BSC contains a control device CD which, after evaluation of the stored and currently determined characteristic values, drives a voice SPCO and channel codec CHCO, in which the voice and channel coding of the voice signals is carried out, for transmission via the radio interface. In a GSM mobile radio system, this voice SPCO and channel codec CHCO may also be provided in a transcoder unit TRAU, between the base station controller BSC and the switching center SC, which is in the form of a mobile switching center MSC. This transcoder unit TRAU may in turn be integrated in the mobile switching center MSC or in the base station controller BSC.

The voice information, which arrives from a communication link on the network side from the mobile switching center MSC, for example at 64 kbit/s via a PCM link, is voice-coded with the voice codec SPCO using a convolution coding of the source code, and has then a net bit rate of, for example, 13 kbit/s. In the subsequent channel coding in the channel codec CHCO, the bit rate is increased by adding guard bits, for example to a gross bit rate of 22.8 kbit/s, and the voice information coded in this way is transmitted to the base station controller BSC. A comparable voice SPCO and channel codec CHCO is likewise provided in the first radio station TS1. Alternatively, on the basis of the control of the voice and channel coding, the bit rate for error protection can thus be varied in the channel codec, and the gross bit rate at the output of the channel codec can thus be varied, while the net bit rate at the output of the voice codec is kept constant, or the net bit rate at the output of the voice codec, and thus the bit rate of the error protection in the channel codec are varied, with the gross bit rate at the output of the channel codec being kept constant. In this way, it is possible on the one hand to reduce the required transmission capacity while, on the other hand, the voice quality can be improved by improved voice coding with a constant transmission capacity.

Figure 3:
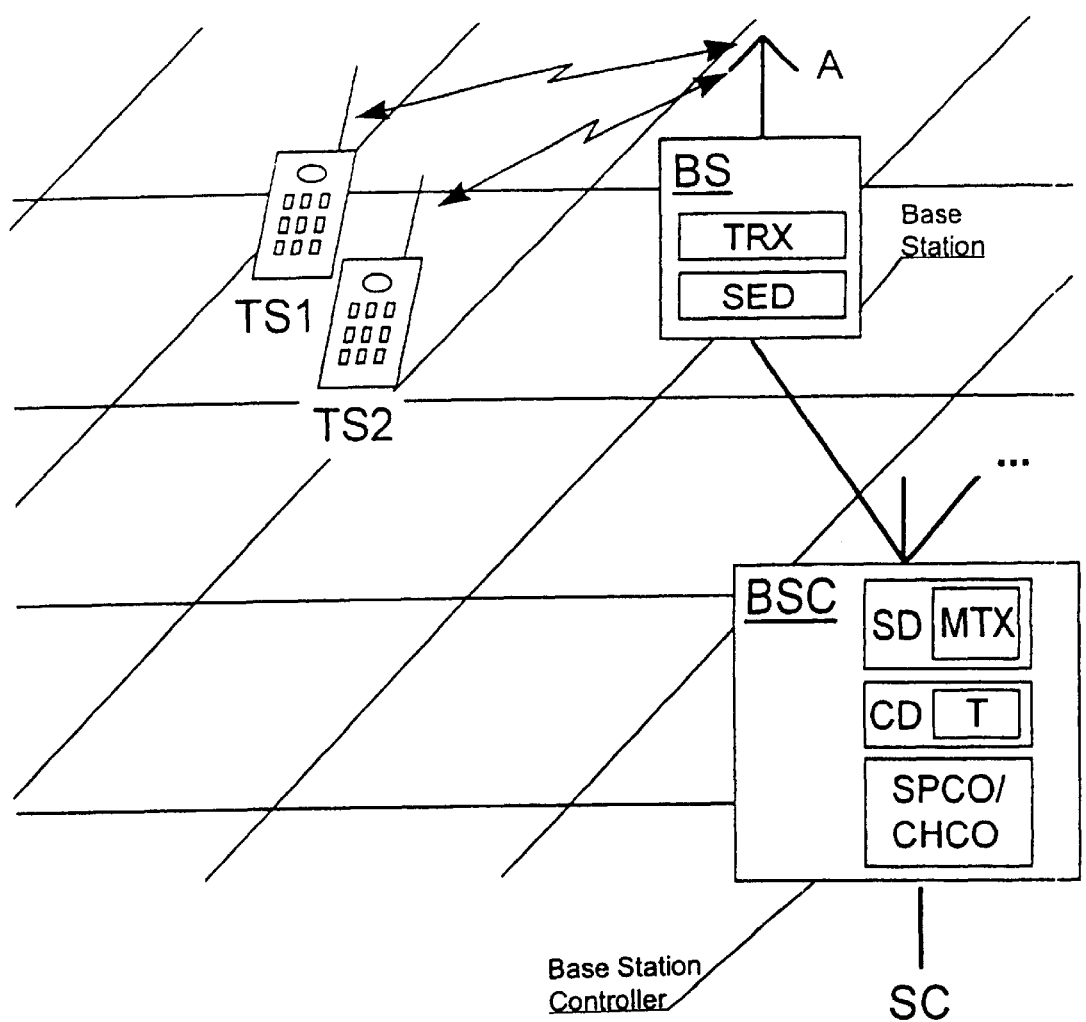
FIG. 3 is a block diagram corresponding to FIG. 2, with the radio coverage area of the base station being split into geographical subareas.

FIG. 3 shows a base station system, corresponding to FIG. 2, for a mobile radio system having a base station controller BSC which is connected to a switching center SC, and a base station BS. A first radio station TS1 and a second radio station TS2, which are in the form of mobile stations, are located in the radio coverage area of the base station BS. The radio coverage area of the base station BS is split into individual geographical subareas.

The locations of the two radio stations TS1, TS2 are determined for example through the use of a GPS system (Global Positioning System) and are each assigned to a geographical subarea. This can be done in such a manner that the position details are calculated and signaled to the base station BS in each of the radio stations TS1 and TS2. The signal evaluation device SED in the base station BS then determines the respective assignment to a geographical subarea.

In order to use these specific location details for the radio stations TS1, TS2, a three-dimensional memory matrix MTX, a segment of which is illustrated by way of example in FIG. 4, is provided in the storage device SD in the base station controller BSC. This memory matrix MTX corresponds in the fundamental plane, indicated by the axes x and y, to the splitting of the radio coverage area of the base station BS into geographical subareas which are identified, by way of example, by the letter sequence A, B, . . . in the x-direction and by the numerical sequence 1, 2, . . . in the y-direction, in order to address the individual subareas. Addressing can likewise be carried out in a corresponding manner using binary numbers. The third dimension of the memory matrix MTX corresponds to a time axis t which may be subdivided, for example, into hour, minute and second steps.

The characteristic values are entered in this memory matrix MTX on the basis of the geographical subarea in which the respective radio station TS1 or TS2 is located, and on the basis of time. Furthermore, a respective weighting coefficient may be stored for each geographical subarea in the memory matrix MTX. This weighting coefficient is defined, for example, during network planning and depends predominantly on the geographical characteristics in the subareas. One possible representation of this weighting coefficient is a multiplication factor of between 0 and 1, with which the characteristic values are weighted. A weighting coefficient with the value 1 may be defined, for example, for a rural region in which there are only a small number of shadows and where the traffic density is only less than average. In regions having a high population density, on the other hand, the weighting coefficient may be, for example, 0.5, that is to say disturbances in the transmission occur frequently due to shadowing, and the traffic density being high.

Furthermore, the weighting coefficient may be varied with time since, for example at peak times where the traffic load is very high, the transmission quality is subject to additional adverse effects. This weighting of the characteristic values is used to influence the control of the voice and channel coding so that greater error protection is carried out if the weighting coefficient is low than if the weighting coefficient is high, irrespective of the actual conditions represented by the characteristic values.

The successive determination of the characteristic values may, for example, be controlled by a timer T which is provided in the control device CD and initiates the determination and the entry of the characteristic values to match the time steps in the memory matrix MTX. This timer T can also be used to control the voice SPCO and channel codec CHCO. In addition, the determination of the characteristic value and the mid control of the voice SPCO and channel codec CHCO can also be carried out when the mobile station moves to another geographical subarea.

In the example illustrated in FIG. 3, the voice SPCO and channel codec CHCO is configured in such a manner that the net bit rate can vary on the basis of the voice coding and/or the gross bit rate can vary on the basis of the channel coding. The voice codec SPCO and the channel codec CHCO is controlled by the control device CD, which evaluates the characteristic values stored in the memory matrix MTX. In the example, the first radio station TS1 and the second radio station TS2 are located in the same geographical subarea. In order to control the voice and channel coding for voice transmission to the first radio station TS1, the control device CD evaluates the currently determined characteristic values and the characteristic values stored in the memory matrix MTX for the first radio station TS1 and the second radio station TS2.

The characteristic values which have been stored over a number of time steps by the same mobile stations, or those which have been stored, for example, on the previous day for other mobile stations, can then in each case be taken into account for the evaluation. The time period or the number of characteristic values to be considered may be defined by the control device CD, and it is possible to calculate the statistical mean value or the difference in each case.

In the situation where the first radio station TS1 moves into another geographical subarea, in which the second radio station TS2 is already located, the control device CD can access the already determined characteristic values relating to the second radio station TS2 in order to control the voice and channel codec SPCO/CHCO, and can thus immediately generate optimum voice and data coding for voice transmission to the first radio station TS1.

FIG. 5 shows a flowchart of the method according to the invention. The individual steps correspond to the items described in the description relating to FIG. 3 and FIG. 4.

In a first step, a signal is transmitted between the radio stations TS1, TS2 of subscribers who are located in the radio coverage area of the base station BS, and the base station BS itself. At least one characteristic value is then in each case determined in a signal evaluation device SED, allowing a statement to be made with regard to the transmission response or transmission conditions of the radio interface. In this case, the characteristic values may be determined in the base station BS and/or in each of the radio stations TS1, TS . . . . he respective location of the radio stations TS1, TS2 . . . is determined in a third step. This may be done, for example, via a described GPS system. An assignment to geographical subareas in the radio coverage area of the base station BS is carried out on the basis of the determined locations. Before storing the determined characteristic values, they may be weighted with a weighting coefficient which is defined for the respective geographical subarea and allows the coding to be influenced directly irrespective of the actually existing transmission conditions, in order to ensure a constantly high transmission and reception quality.

The characteristic values which are stored in the memory matrix MTX are then evaluated by the control device CD in the base station controller BSC and, for example, are used together with currently determined characteristic values for a control of the voice codec SPCO for voice coding and of the channel codec CHCO for channel coding. The determination and control of the coding is controlled by a timer T, so that any possible change in the transmission characteristics is determined at fixed time intervals, and the coding is controlled in a corresponding manner. Furthermore, on the basis of any change found in the location, for example when the first radio station TS1 moves from one geographical subarea of the radio cell to another geographical subarea, detection of the characteristic values can be initiated, as well as the control of the coding required as a consequence of this. When the first radio station TS1 moves to an adjacent radio cell, the characteristic values stored for the original geographical subarea may remain in the memory matrix MTX and be used for further radio stations TS2 . . . which remain or enter the same geographical subregion in order to use these empirical values to match the coding to the transmission response more quickly.

The method may be carried out in the described sequence, or else in any other sequence as well. For example, the weighting of the characteristic values by the respective weighting coefficient may also be carried out by the control device CD after the evaluation of the memory matrix MTX, and the determination of the location of the radio stations TS1 and TS2 may be carried out in parallel with the determination of the respective characteristic value.

We claim:

1. A method for voice transmission via a radio interface in a digital radio communication system including a base station connected to a base station controller, and a radio station located in a radio coverage area of the base station, the method comprising:

transmitting a signal via a radio interface between a radio station and a base station;

determining, from the signal, an initial characteristic value relating to transmission conditions of the radio interface;

storing the characteristic value in a storage device for providing a stored characteristic value;

performing, with a voice and channel codec, a voice and channel coding at a transmitter side for a voice transmission;

controlling the voice and channel coding at the transmitter side by taking into account a currently determined characteristic value and the initially determined stored characteristic value;

determining further characteristic values relating to the transmission conditions between the base station and further radio stations located in the radio coverage area of the base station;

storing the further characteristic values in the storage device for providing stored further characteristic values; and taking into account the initially determined stored further characteristic values and currently determined further characteristic values for controlling the voice and channel coding at the transmitter side for the voice transmission between the base station and the radio station.

2. The method according to claim 1, which comprises:

dividing a radio coverage area of the base station into geographical subareas;

determining a location of the radio station by at least one of a global localization system, directional antennas, range measurements and a network planning; and assigning the location of the radio station to one of the geographical subareas of the radio coverage area of the base station.

3. The method according to claim 2, which comprises:

determining further characteristic values relating to the transmission conditions between the base station and further radio stations located in the one of the geographical subareas;

storing, in the storage device, the further characteristic values for providing stored further characteristic values; and taking into account the previously determined stored further characteristic values and currently determined further characteristic values for controlling the voice and channel coding at the transmitter side for the voice transmission between the base station and the radio station.

4. The method according to claim 2, which comprises:

providing a three-dimensional memory matrix in the storage device; and storing the characteristic value in the three-dimensional memory matrix on the basis of the one of the geographical subareas and on the basis of time.

5. The method according to claim 2, which comprises:

weighting the characteristic value by a weighting coefficient; and defining the weighting coefficient for the geographical subareas as a function of geographical characteristics during the network planning.

6. The method according to claims 2, which comprises determining the characteristic value when the radio station moves from one of the geographical subareas to another one of the geographical subareas.

7. The method according to claim 1, which comprises:

dividing a radio coverage area of the base station into geographical subareas;

combining given ones of the geographical subareas having at least similar geographical characteristics for forming a geographical area having a common weighting coefficient for weighting the characteristic value.

8. The method according to claim 1, which comprises:

determining a statistical mean value of the stored characteristic value and the currently determined characteristic value; and controlling the voice and channel coding at the transmitter side by taking into account the statistical mean value.

9. The method according to claimed 1, which comprises:

determining a difference between the stored characteristic value and the currently determined characteristic value; and controlling the voice and channel coding at the transmitter side by taking into account the difference.

10. The method according to claim 1, which comprises determining, as the characteristic value, at least one of a reception level, a bit error rate, a value proportional to a signal propagation time between the radio station and the base station, and a signal-to-noise ratio.

11. The method according to claim 1, which comprises:

weighting the characteristic value by a weighting coefficient; and varying the weighting coefficient as a function of time.

12. The method according to claim 1, which comprises determining the characteristic value periodically at given time intervals.

13. In a digital radio communication system having a plurality of radio stations, a base station system, comprising:

a base station covering a radio coverage area and having a transmitting/receiving device for transmitting and receiving voice information via a radio interface between said base station and one of the radio stations located in the radio coverage area of said base station;

a base station controller connected to said base station;

a signal evaluation device for determining a characteristic value from a signal transmitted via the radio interface, the characteristic value relating to transmission conditions of the radio interface, and a plurality of further characteristic values relating to the transmission conditions between the base station and further radio stations located in the radio coverage area of the base station;

a storage device storing the characteristic value and the further characteristic values for providing stored characteristic values;

a voice and channel codec associated with said base station controller, said voice and channel codec performing a transmitter-side voice and channel decoding for a voice transmission via the radio interface; and a control device operatively connected to said voice and channel codec for controlling the transmitter-side voice and channel decoding as a function of the stored characteristic values having been determined previously and characteristic values having been determined currently.

14. The base station system according to claim 13, wherein:

said voice and channel codec includes a voice codec device having a voice codec output and a channel codec device having a channel codec output; and said control device drives said voice and channel codec such that an error protection bit rate in said channel codec device and a gross bit rate at said channel codec output vary and a net bit rate at said voice codec output remains constant.

15. The base station system according to claim 13, wherein:

said voice and channel codec includes a voice codec device having a voice codec output and a channel codec device having a channel codec output; and said control device drives said voice and channel codec such that a net bit rate at said voice codec output and an error protection bit rate in said channel codec vary and a gross bit rate at said channel codec output remains constant.

16. The base station system according to claim 13, wherein said base station supplies the radio coverage area as an area being split into geographical subareas, and including at least one element selected from the group consisting of a global localization system, directional antennas, range measurement devices and a network planning for determining a location of the radio station.

17. The base station system according to claim 16, wherein said storage device includes a three-dimensional memory matrix, said three dimensional memory matrix stores the characteristic values relating to the transmission conditions between said base station and the radio station and between said base station and further radio stations located in a same one of the geographical subareas as the radio station, said three dimensional memory matrix storing the characteristic values according to the geographical subareas and according to time.

18. The base station system according to claim 16, wherein said storage device includes a three-dimensional memory matrix, said three dimensional memory matrix stores the characteristic values relating to the transmission conditions between said base station and the radio station and between said base station and further radio stations likewise located in the radio coverage area of said base station, said three dimensional memory matrix storing the characteristic values according to the geographical subareas and according to time.

19. The base station system according to claim 18, wherein said three-dimensional matrix stores weighting coefficients assigned to the geographical subareas.

20. The base station system according to claim 16, wherein said control device weights the characteristic value by a weighting coefficient defined for each of the geographical subareas and varying as a function of at least one of geographical characteristics and time.

21. The base station system according to claim 13, wherein said base station is configured to receive the characteristic value from the radio station after the characteristic value has been determined by the radio station.

22. The base station system according to claim 13, wherein said control device includes a timer for periodically initiating, at given time intervals, a determination of the characteristic value.

23. The base station system according to claim 13, wherein said control device determines a difference between the stored characteristic value and the currently determined characteristic value.

24. The base station system according to claim 13, wherein said storage device and said control device are provided in said base station controller.

25. The base station system according to claim 13, wherein said control device determines a statistical mean value of the characteristic value.

26. The base station system according to claim 13, wherein said storage device and said control device are provided in said base station.

* * * * *